United States Patent [19]
Kennedy et al.

[11] 4,153,305
[45] May 8, 1979

[54] RAILROAD AIR BRAKE SYSTEMS

[75] Inventors: Leroy P. Kennedy, Mahwah, N.J.; James L. Kalkstein, Monsey, N.Y.

[73] Assignee: Abex Corporation, New York, N.Y.

[21] Appl. No.: 882,791

[22] Filed: Mar. 2, 1978

[51] Int. Cl.² ............................................. B60T 17/04
[52] U.S. Cl. ........................................ 303/81; 303/86
[58] Field of Search ............... 303/13, 18, 69, 70, 303/80, 81, 86, 89

[56] References Cited

U.S. PATENT DOCUMENTS

| | | | |
|---|---|---|---|
| 1,703,889 | 3/1929 | Livingston | 303/86 |
| 1,739,584 | 12/1929 | Farmer | 303/86 |
| 1,957,692 | 5/1934 | Campbell | 303/81 |
| 2,048,353 | 7/1936 | Rose | 303/86 |
| 3,265,448 | 8/1966 | Newell | 303/86 |

*Primary Examiner*—Duane A. Reger
*Attorney, Agent, or Firm*—Kinzer, Plyer, Dorn & McEachran

[57] ABSTRACT

Brake system for a railroad vehicle in which the angle cocks and cut-off valve are eliminated and supplanted by a single valve assembly in a valve housing positioned at the junction of the brake pipe and branch pipe; the valve element is in the form of a selectively positionable seal support member carried on a shaft which may be operated from a safe position at either side of the vehicle; a positive lock holds the position of the valve element and is designed to discourage vandalism.

17 Claims, 12 Drawing Figures

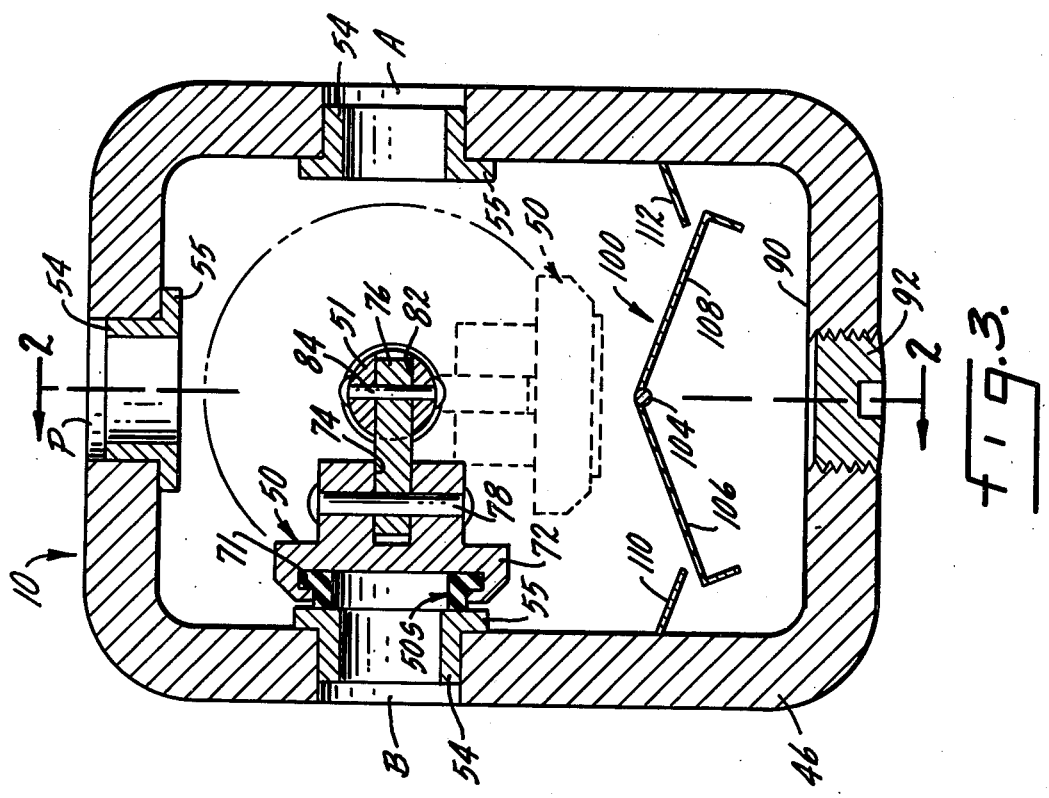
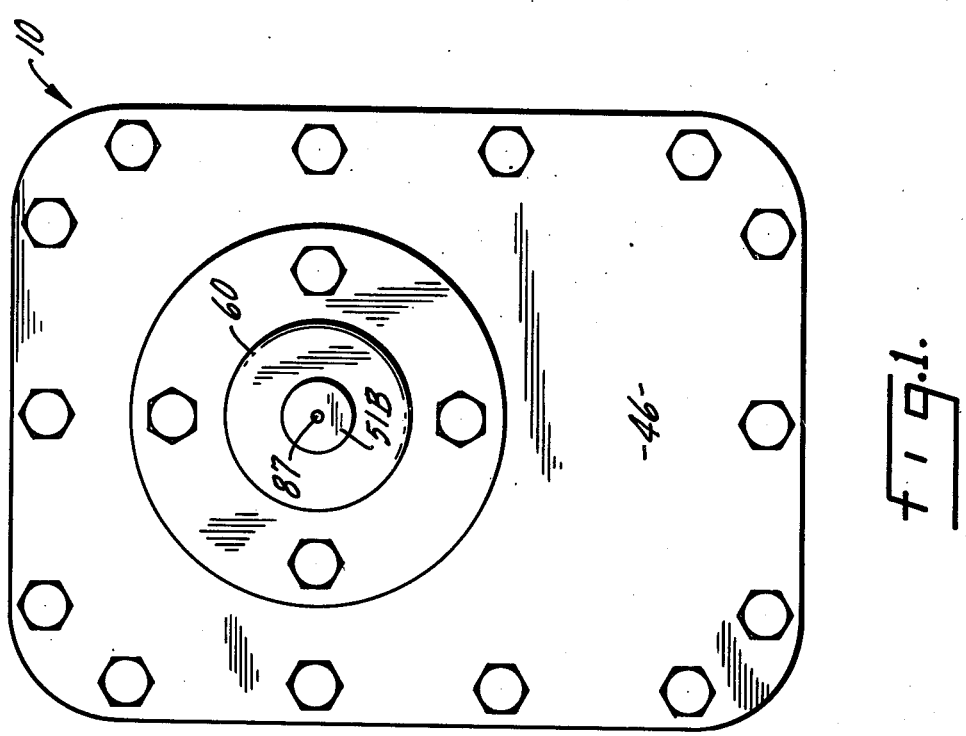

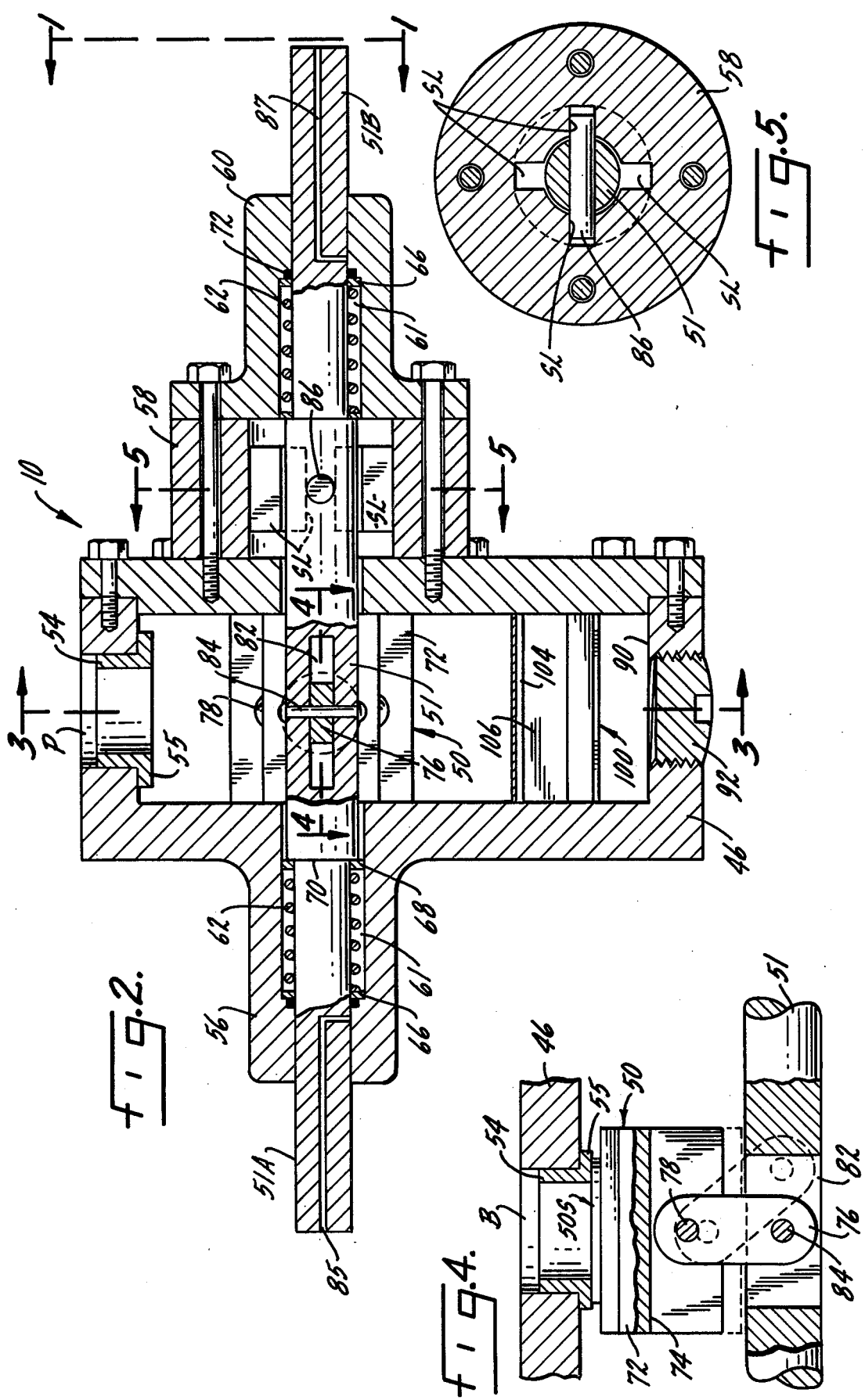

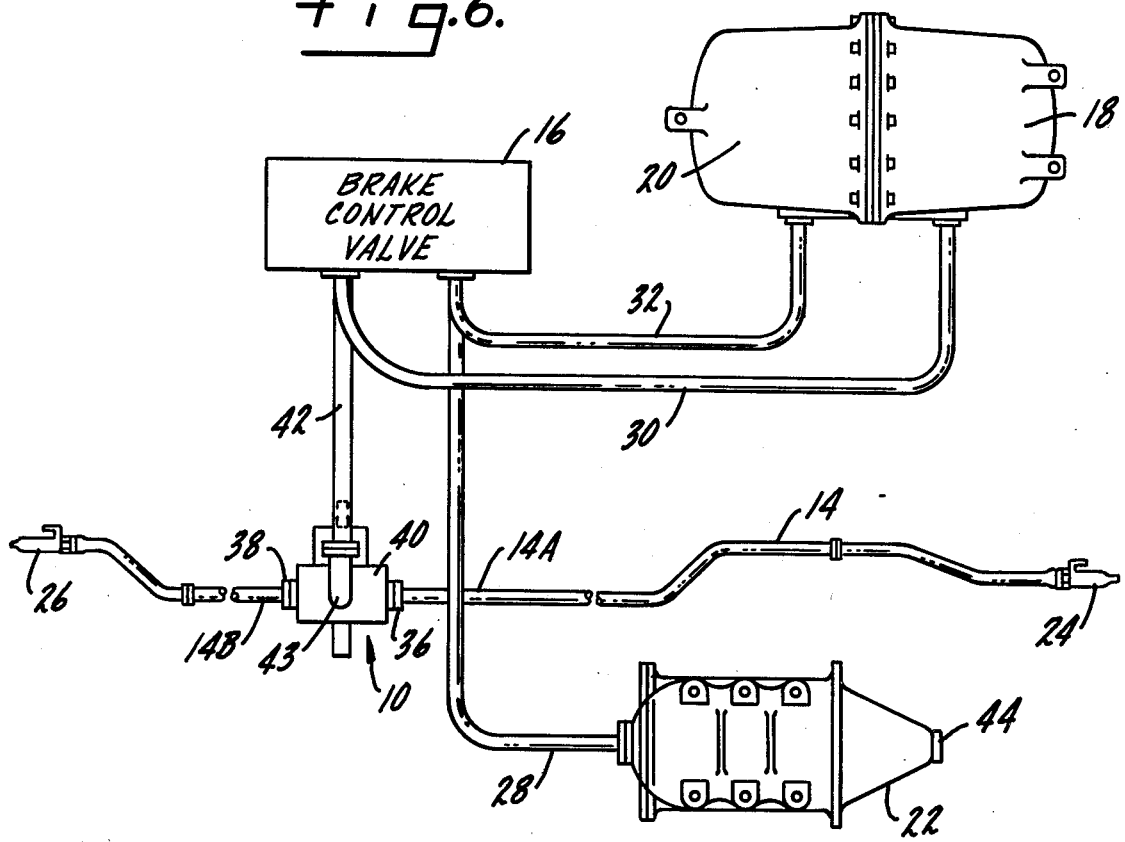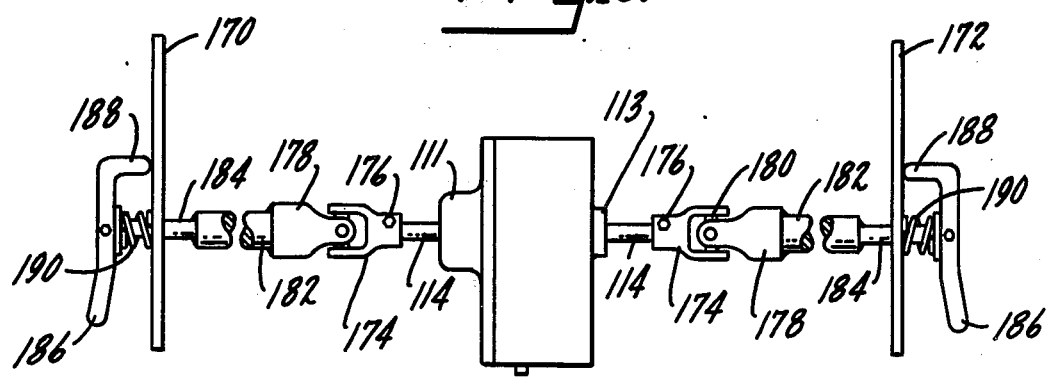

RAILROAD AIR BRAKE SYSTEMS

This invention relates to the brake system of a railroad vehicle.

The standard air brake system on a railroad car includes a brake cylinder (or cylinders) which, when the brake is to be applied, receives air from an auxiliary reservoir. The air so received is released from the auxiliary reservoir by opening a brake valve which is interposed between the brake cylinder and auxiliary reservoir. The brake valve is connected by a branch pipe to a brake pipe connected to the main air reserve at the locomotive. All this is well known.

The brake pipe is supported by the car; so are the combined emergency and auxiliary reservoir, brake valve, branch pipe and brake cylinders. At each end of the car there is a hose connected to the end of a like hose on the next car via a hose coupling.

Each hose on the car has a so-called angle cock valve which enables the related end of the brake pipe to be cut in (opened) or cut out (closed). The angle cock valve is located in a hazardous position near the car couplers and the primary object of the present invention is to reduce the probability of injury by eliminating both angle cock valves and incorporating their functions in a single multifunction valve assembly so located that it can be easily operated from either side of the car, at a location remote from the car couplers.

The aforementioned brake valve is itself associated with a cut-out valve to enable the brake valve be isolated if the occasion should arise. This cut-out valve is located in the branch pipe in a position where it is sometimes difficult to operate the cut-out valve. Another object of the present invention is to remove the cut-out valve and incorporate its function in the same combination valve assembly which replaces the angle cock valves. Another object of the invention is to so construct the valve assembly as to accommodate a dirt trap.

As can be imagined, there is a maze of equipment slung beneath the car from one end to the other, amounting to considerable impediment to discerning how the objects of the present invention could be reduced to practice without altering in any material way the standard system which evolved over a long period of time.

It is therefore another object of the invention to eliminate the three valves identified above while enabling their functions to be realized by a single, combined valve assembly so located that no material alteration need otherwise be made in the standard railroad air brake system. This object can be accomplished by installing a valve assembly at the "T" junction where the branch pipe meets the brake pipe in the standard system, replacing the standard "T" fitting with a valve housing incorporating a valve capable of performing the functions of the combination dirt collector and cut-off valve and the two end-of-vehicle angle cock valves of the standard system.

IN THE DRAWING

FIG. 1 is an end view of the valve structure on the line 1—1 of FIG. 2;

FIG. 2 is a sectional view on the line 2—2 of FIG. 3;

FIG. 3 is a sectional view taken on the line 3—3 of FIG. 2;

FIG. 4 is a detail view, partly in section of the valve element and its operating shaft, taken at line 4—4 of FIG. 2;

FIG. 5 is a sectional view on the line 5—5 of FIG. 2;

FIG. 6 is a plan view of an air brake system at the underside of a railroad car;

FIG. 10 is an assembly view showing the manner in which the valve assembly may be suspended beneath the vehicle, and operated from either side thereof;

Figure 7:
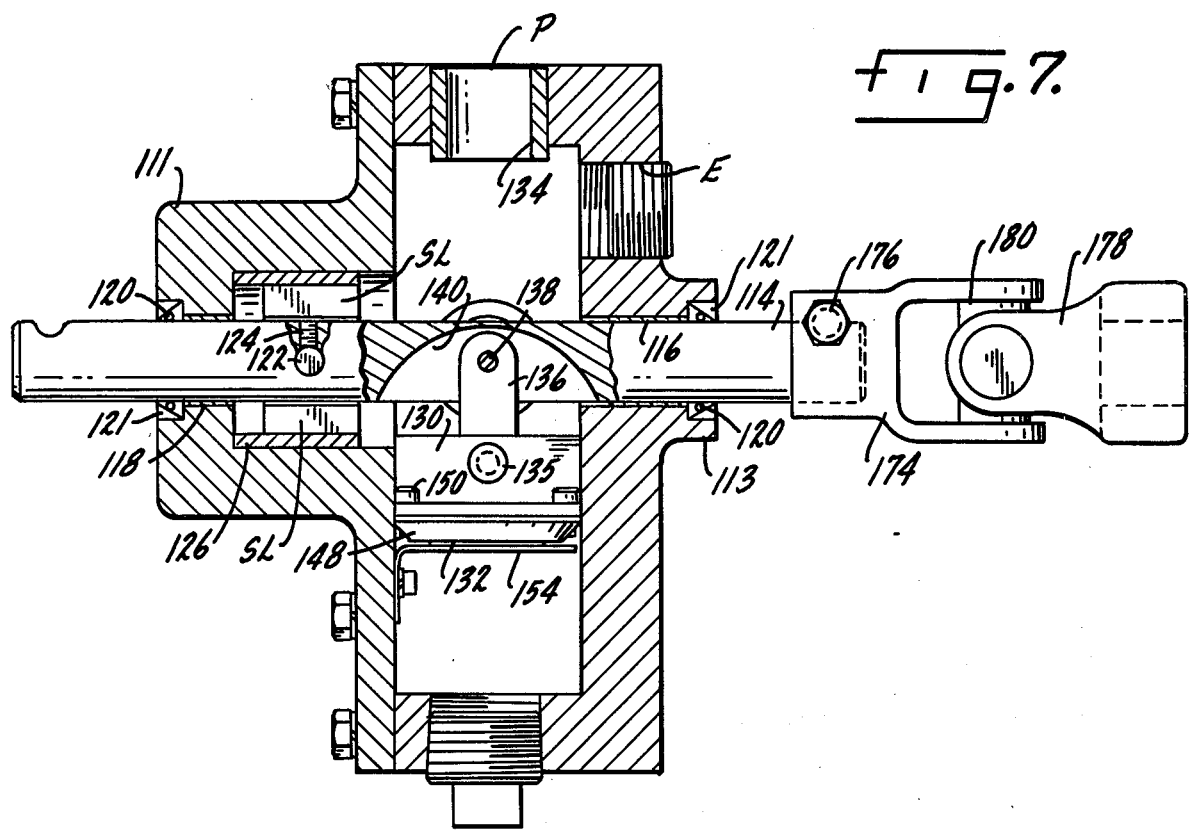
FIG. 7 is a sectional view, similar to FIG. 2, showing a modified form of valve assembly in accordance with the present invention.

Except for the valve installation 10, the air brake system shown in FIG. 6 is a standard one for railroad cars, installed beneath the car frame.

The brake system comprises a brake pipe 14, a brake valve 16, an auxiliary air reservoir 18, an emergency air reservoir 20 and a brake cylinder 22.

The brake pipe has couplers 24 and 26 for coupling to the brake pipe on the car ahead and the car behind. The brake pipe receives air indirectly from the main locomotive reservoir (not shown).

A brake cylinder pipe 28 is connected at its opposite ends to the brake valve 16 and brake cylinder 22. An auxiliary reservoir pipe 30 is connected at its opposite ends to the auxiliary reservoir 18 and valve 16. An emergency reservoir pipe 32 is connected at its opposite ends to the emergency reservoir 20 and the brake valve.

In accordance with the present invention, the brake pipe for each car is sectioned in effect so there are two end sections 14A and 14B, flange-mounted in respective fittings 36 and 38 attached to the valve housing 40 which is part of the valve installation or assembly 10.

A branch pipe 42 is flange-mounted at one end in a third fitting 43 which is attached to the top of the valve housing. The opposite end of the branch pipe 42 is connected to the brake valve 16.

When the brake is to be applied, in the standard air brake, air under pressure in the brake pipe 14 is reduced; reduced pressure is also established in the branch pipe 42, opening the brake vale 16. Since the brake valve is opened, air under pressure in the auxiliary reservoir flows through pipe 30, flows through passages in the brake valve, and is delivered from thence through pipe 28 to operate the brake cylinder 22; the brake apply piston 44 extends to actuate the supports for the brake shoes (or brake discs) to apply brake forces to the car wheels.

Valve assembly 10 is installed in the standard system at (and takes the place of) the standard, special "T" fitting normally installed where the branch pipe 42 communicates with the brake pipe. This can be readily seen in FIG. 6 and it will also be recognized by those skilled in the art that there are no angle cocks in the brake pipe adjacent the couplers 24 and 26; nor is the branch pipe 42 equipped with the usual combination dirt collector and cut-out cock. Rather, valve assembly 10 is constructed to enable either one of the brake pipe sections 14A or 14B to be closed or cut out, and the brake valve 16 as well, by merely positioning a valve element inside its valve housing 46, FIG. 2, as will now be described.

The valve housing 46 is generally rectangular in appearance. The aforementioned fittings to which the pipe ends are connected are appropriately secured to the exterior sides of the valve housing. The interior or chamber of the valve housing is of sufficient dimension to enable a valve member 50 of plug form to be moved radially therein, to one of four positions, by an operating shaft 51, FIGS. 2 and 3. The preferred shaft motion is rotary and in this connection it will be noted from FIG. 2 that opposed walls of the valve chamber closely confine the valve plug 50 so that it is guided by the valve chamber side walls when orbited from one position to another.

The valve housing has three openings A, B and P, FIG. 3, each of which may be lined with a bronze sleeve 54 having an interiorly-located annular seat 55 to be sealed selectively by the valve member. Each sleeve 54 is press-fitted in place.

Shaft 51 which carries valve member 50 is located at the intersection of the three valve housing openings. Member 50 has a seal 50S supported thereon to engage selectively one of the three seats 55. By turning member 50, its seal may be presented in the normal position (dashed line, FIG. 3) to communicate the brake pipe section openings A and B to one another and to the branch pipe opening P as well, FIG. 3. This may be viewed as the first or "valve in" position where air flows through the brake pipe from one end of the car to the other and flows to the brake valve as well.

The valve or seal support member 50 may be turned clockwise from the dashed-line position as viewed in FIG. 3 to a second position shown by solid line where the seal 50S blocks the brake pipe section 14B or it may be positioned in the third position so that seal 50S blocks the other brake pipe section end. In the fourth position, the branch pipe is cut "out", disabling the brakes on the car, but the brake pipe is "in" on both sides of valve member 50.

The valve member 50 may be easily turned from a safe position at either side of the railroad vehicle. This is accomplished by extending ends 51A and 51B of shaft 51 outward of opposite sides of the valve assembly and equipping the extended end portions with handle attachments of whatever length and configuration may be necessary as will be described below.

The valve assembly may be suspended in a fixed position beneath the car frame as by a bracket; also indicia may be provided adjacent the valve operating handles (not shown) for showing the valve position. A locking means is employed to hold the valve in the position to which the operating rod is turned. Details of the valve lock and its operation will now be described.

The shaft 51 is supported and guided in part by a first boss 56 projecting from one side of the valve housing as shown in FIG. 2.

A lock mechanism including a sleeve 58 is secured to the opposite side of the valve housing, interposed between the valve housing and a second support boss 60 which is secured thereto.

Each guide boss 56 and 60 has an enlarged internal chamber 61 in which is positioned a centering coil spring 62, as shown in FIG. 2. A washer 66 is located at the outer end of each chamber 61, serving as a seat for the corresponding end of the coil spring. The opposite end of each coil spring bears against a second washer 68 which in turn engages a stop shoulder 70 formed on the operating shaft 51. An O-ring 72 surrounds the portion of shaft 51 outward of each washer 66 to afford an air-tight seal.

The two springs 62 operate normally to bias shaft 51 with the valve member 50 centered so that its seal 50S seals the periphery of whichever insert 55 it may be aligned with when in the second, third, or fourth position. The seal 50S is an approved AAR seal member and is retained in an annular recess 71 formed in the head 72 of the valve member 50, as shown in FIG. 3.

The valve member 50 is so linked to shaft 51 that it may be displaced along its axis, coaxial with respect to the associated insert 54, when shaft 51 is moved axially. In accomplishing this, the valve member 50 is provided with a slot 74, FIG. 3, in which one end of a toggle link 76 may be located. A pin 78 extends through slot 74 and through an opening in link 76 as shown in FIG. 3. Link 76 is loose on the pin so that it may swing with respect thereto. The opposite end of link 76 extends into a slot 82, FIG. 2, formed in shaft 51; link 76 is connected to shaft 51 by a pin 84, FIG. 3, so that the link is normally at right angles to the axis of the shaft; again the pin connection is a loose one so that link 76 may swing with respect to pin 84.

The lock mechanism, as mentioned above, includes a sleeve or collar 58 interposed between the valve housing and the guide boss 60. The preferred lock is a pin-in-slot and to this end the interior of collar 58 is machined to afford a bore for shaft 51 (as will be apparent from FIG. 2) and also to provide four slots as SL, FIGS. 2 and 5, of cruciform array at 90° displacements corresponding to the four positions of the valve member. A fixed lock pin 86 is press fitted in shaft 51 so that the opposed ends thereof will fit a pair of opposed lock slots SL to hold and maintain the valve member positon.

By applying an axial force in either direction, to either end 51A or 51B of shaft 51, the lock pin 86 may be displaced from its detent slot as will be evident from the clearances provided at the ends of the slots as shown in FIG. 2.

As long as the lock pin 86 is disposed in a detent slot, only axial displacement of shaft 51 is possible. As axial displacement occurs, link 76 swings (see FIG. 4) and at the same time displaces valve plug 50 (laterally off the valve seat co-axial with the axis of the opening with respect to which it is aligned. When pin 86 is displaced entirely from the locking slot, then it is possible to rotate shaft 51, and valve member 50 revolves therewith. The operator can "feel" for the new detent position and when alignment is achieved the axial displacement force applied to shaft 51 is relaxed allowing the compressed spring 62 to return the shaft to its normal position with the lock pin 86 disposed in a new slot. In connection with movement of valve member 50, it will be noted in FIG. 2 that the inside of the valve housing narrowly confines valve member 50 in a guiding relationship.

A strong manual force is required to displace shaft 51. This coupled with the lock discourages tampering.

The spring force tending to center shaft 51 in the second, third or fourth position of the valve member is sufficient, combined with the dimensioning of link 76, to compress the seal member by approximately ten percent of its thickness. Also, the pressure of compressed air in the brake pipe, released to the inside of the valve housing, is sufficient to apply additional compressive forces to the seal carrier assembly 50, further compressing the seal against its seat 55. The force of the air, however, does not prevent manual displacement.

In the event of failure properly to present the seal to its seat, failure will be in the safe condition, i.e., the air will leak, diminishing the pressure in the branch pipe, and allowing the brake to be set automatically in the actuated condition. In this same connection it will be noted that vent passages 85 and 87 are drilled in the extended ends 51A and 51B of the operating shaft, communicable with the spring chambers 61, and hence with the inside of the valve housing, in the displaced position of the operating shaft. Hence an audible hiss of air is perceived when the valve is being displaced and moved into a new position. When the valve member is repositioned and the displacement force relaxed, allowing the seal to re-seat, this audible signal will terminate if the seal is correctly re-seated, signifying an operative state.

The valve assembly of the present invention incorporates a dirt trap collector which serves to confine dirt to a chamber at the bottom of the housing 46. In this connection it will be noted from FIG. 3 that shaft 51 is located within the upper half of the interior of the valve housing. When there is air flow, any dirt particles impinging on shaft 51 tend to be slowed, swirled and settled on the bottom wall 90 of the housing, FIG. 3. Accumulated deposits may be removed by removing a drain plug 92 threadedly mounted in the bottom wall 90.

Since the valve assembly of the present invention may be mounted on a hopper car, a dirt trap or retainer means 100 is incorporated inside the valve housing to prevent dirt from being dumped into the upper half of the valve housing when the hopper car is tipped The dirt trap, FIG. 3, comprises a hinged, swinging baffle hinged at 104, and having downwardly sloped side plates 106 and 108 which normally direct dirt downward to the bottom wall 90.

To trap the dirt when the car is tipped or tilted, there are a pair of stop plates 110 and 112 over-hanging the respective side plates 106 and 108. The stops are spaced above the side plates in the normal attitude of the railroad vehicle, allowing space for the dirt to slide therepast but if the car is tipped the baffle swings toward and into contact with one or the other of the stops thereby to trap the dirt.

A modified valve assembly is shown in FIG. 7, incorporating several preferred changes compared to the above described modification. Only the essential changes will be described.

The projecting bosses 111 and 113 on the valve housing which serve to afford supports for valve positioning shaft 114 are provided with bores having bronze sleeve bearings 116 and 118 which support shaft 114. The ends of the bores in the bosses, outward of the sleeve bearings, are enlarged to accommodate compound seals, each of which includes an O-ring 120 retained by annular member having a lip 121 for wiping the shaft during axial movement.

The position of shaft 114, as in the foregoing embodiment, is held by a lock. The lock includes a lock pin 122 extending through an opening in shaft 114, just as in the foregoing embodiment, held in place by a set screw 124.

Figure 8:
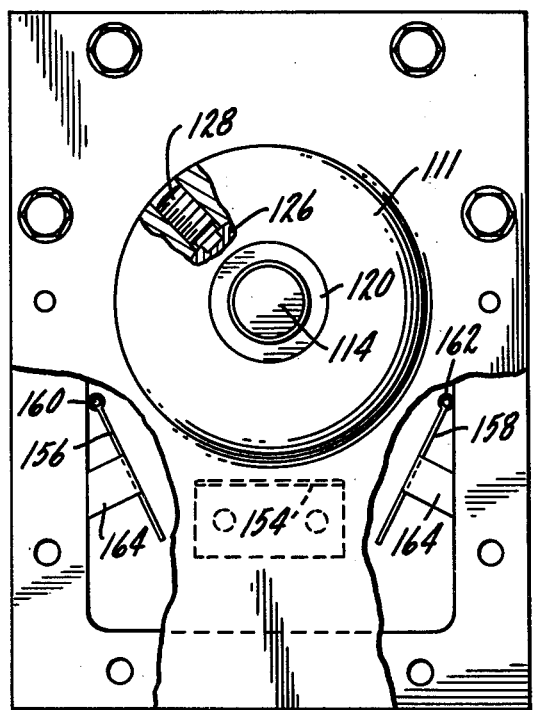
FIG. 8 is an end view of the valve assembly shown in FIG. 7, partly broken away.

The lock, as in the foregoing embodiment, includes a collar 126 inserted into one of the housing bosses; collar 126 is secured in place by a dowel 128, FIG. 8. The collar 126 has four lock slots SL for the projecting ends of the lock pin, the lock slots being diametrically opposed in pairs as in the foregoing embodiment so that there are four 90° displaced positions for shaft 114, corresponding again to four different positions for the valve member.

The valve member 130, as in the foregoing embodiment, while it may be conveniently termed a plug, carries a seal 132 adapted, in one of three positions, to seal off one of the three openings in the housing to which a pipe end is communicated; only one opening is shown in FIG. 7, opening P, lined with a bronze bushing 134.

The valve member 130, FIG. 7, is in the position corresponding to the dashed line position of FIG. 3 where all three openings are disclosed.

As in the foregoing embodiment, valve member 130 is pivotally, loosely joined by a pin 135 to a supporting toggle link 136 in turn pivotally mounted on a pin 138 carried by shaft 114. Shaft 114 is slotted at 140 to enable the upper end of link 136 to be fitted freely therein and after being so fitted the pivot pin 138 is pressed through openings in the shaft, and through the corresponding (aligned) opening in the upper end of link 136 thereby to support the valve member on shaft 114.

Figure 9:
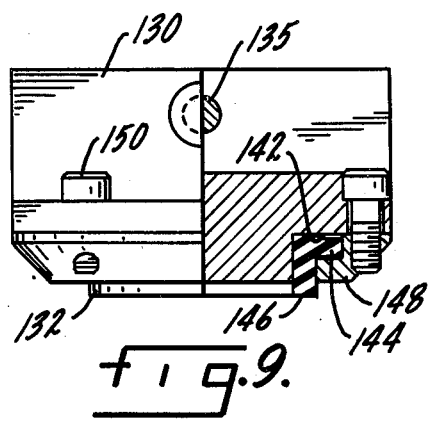
FIG. 9 is a detail view of a preferred form of seal carrier, partly in section.

To limit the change of the seal 132 being dislocated, it is in effect locked positively to the valve member or seal carrier plug 130. Thus, member 130, FIG. 9, is provided at its seal end with an annular recessed shoulder 142. The seal 132 has an annular collar 144 fitting the shoulder 142 and has an annular free end 146 constituting the effective seal element.

The seal 132 is clamped in the recess 142 by a seal retaining ring 148 in turn secured to the carrier 130 by cap screws 150.

To stabilize the valve member when in the position shown in FIG. 7, which may be deemed the at-rest position, a support plate 154 is located therebeneath.

The support plate 154 may be used as part of the dirt collector, FIG. 8. Thus, and again, the operating shaft 114 is located in the upper half of the valve housing, allowing room for dirt to settle and collect on the bottom wall of the valve housing.

Dirt may be guided to the bottom of the housing and retained there (in cooperation with the support plate 154) by two dirt collector guide and trap plates 156 and 158. The dirt collector plates are hinged to the inside vertical walls of the valve housing by hinge pins 160 and 162. The dirt collector guide plates are normally positioned in the attitude shown in FIG. 8, inclined downward, by stops 164 which rest against the inside vertical walls of the valve housing.

If the valve assembly is on a hopper car, the hinged dirt collector guide plates may swing by gravity into bridging contact with the support plate 154 when the car is tipped, trapping the dirt against movement into the portion of the valve housing where the valve member and the pipe openings are located.

In the embodiment shown in FIG. 2, the return springs for centering the valve member and coupling the actuator shaft to the lock are located inside the valve housing. In the preferred embodiment, the return springs are located outside the valve housing as will now be described together with the support for the mechanism and the preferred means for operating the actuator shaft.

Referring to FIG. 10, the entire mechanism may be suspended beneath the railroad vehicle by a pair of support plates 170 and 172 fastened to the frame of the vehicle in dependent relation at each side. These plates may be marked with indicia showing the four positions of the valve: "Air through each end; Air this end only; Air this end only; Brake cut out — Air through".

The actuator shaft in each embodiment extends outward of the sides of the valve housing. To enable rotary motion to be imparted to the actuator shaft, a universal joint is preferrably employed. One fork 174 of the universal joint is keyed to the free end of the actuator shaft as by a bolt 176 keyed through a slot, FIG. 7, in the actuator shaft. The other fork 178 is coupled in the usual fashion to the joint pin 180. The fork 178 is welded to a shaft 182 having an outboard extension 184 journalled in the related support plate (170 and 172) and thereby the entire assembly is suspended beneath the vehicle; the valve housing may be braced to the underside of the vehicle.

Each shaft extension 184 extends outboard of the related support plate and terminates in a handle 186 having an outwardly bent lower portion to afford a good mechanical advantage. The handle has an upper pointer 188 related to the indicia mentioned above.

A centering coil spring 190 is interposed between each handle and the opposed surface of the related support plate. The two coil springs 190 oppose each other, applying an outward thrust against the related handle, thereby serving normally to center the valve member with the lock engaged. By applying an outwardly directed force to the operating handle, which results in compression of the opposed spring, the lock may be disengaged, the shaft turned to re-position the valve member and the force then relaxed to re-engage the lock to hold the valve member in its new position.

The mechanical advantage incorporated in the operating handle aids in gradual displacement of the seal from the bushing seat when air pressure is being contained as in cutting through the brake pipe supply under pressure to an added car or group of cars. Gradual displacement avoids a sudden release of air pressure likely to result in the brake equipment going into an emergency mode.

The dirt collector will trap water as well and the location of the opening as P to the branch pipe is at an elevated, uppermost position, above the axis of the brake pipe further supplementing the principle of having the dirt collector chamber well beneath the axis of the brake pipe.

It will be noted in FIG. 7 there is another opening E in the valve housing, normally plugged in the instance of a conventional railroad car. The purpose of this additional connection is to allow the present valve assembly to be connected to one or more remotely, manually operated valves (not shown) to rapidly exhaust brake pipe air to atmosphere in an emergency as commonly used with caboose cars and locomotives. Such manually operated valve is installed in the caboose cupolo, at each end of the caboose and on the fireman's side of the locomotive cab.

Figure 11:
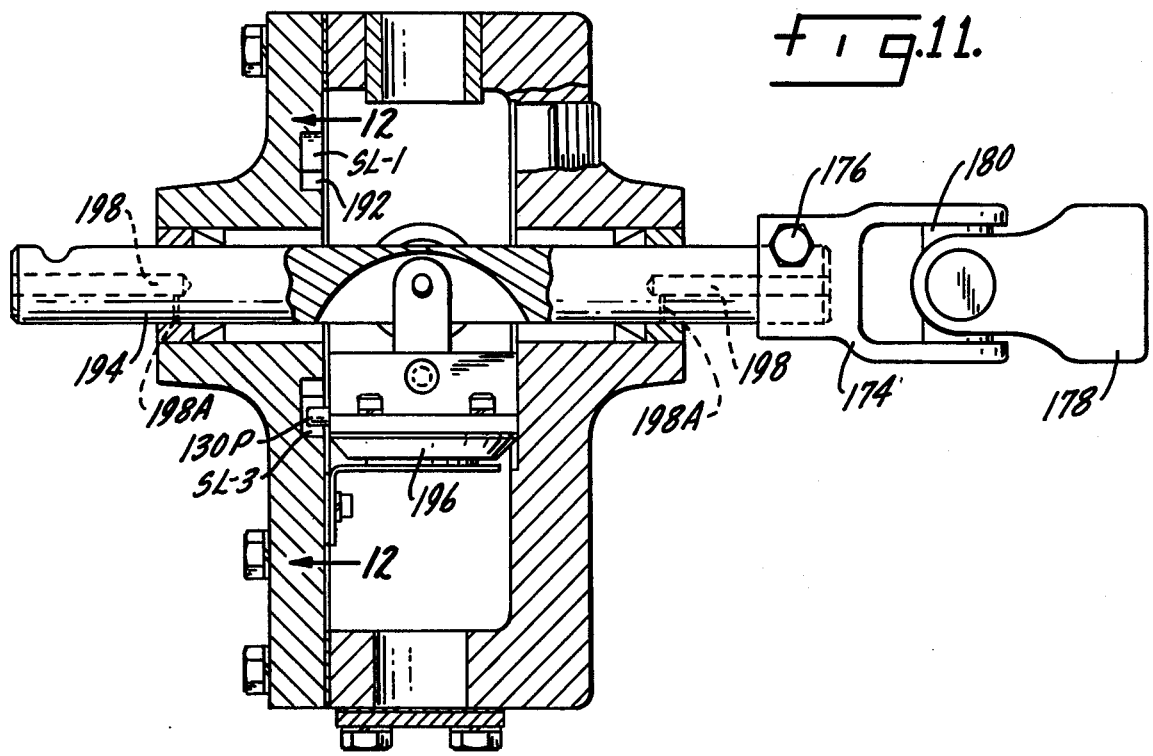
FIG. 11 is a sectional view, similar to FIG. 7, showing a modified form of lock, bearing and seal for the operating shaft.
Figure 12:
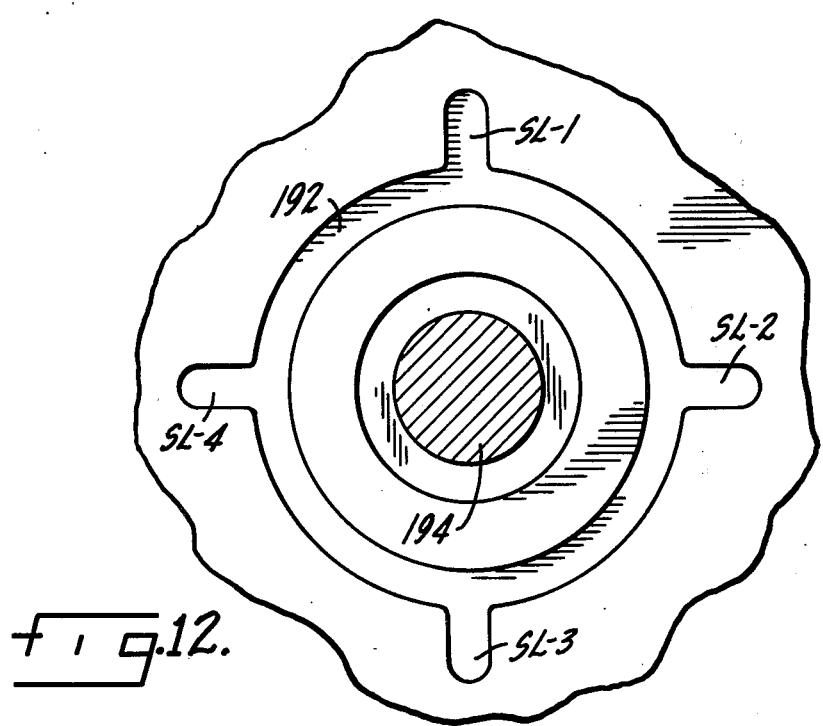
FIG. 12 is a fragmentary detail view on an enlarged scale, showing the groove in which the lock pin rotates, taken substantially on the line 12—12 of FIG. 11.

FIG. 11 shows another form of pin-in-slot lock to hold the position of the operating shaft. One of the interior walls of the valve housing, as shown in FIG. 12, is provided with an annular groove 192 and four slots SL-1, SL-2, SL-3 and SL-4 at 90° displacement. Two of the slots are shown at SL-1 and SL-3 in FIG. 11, displaced by 180°. The seal carrier or valve plug member has a laterally projecting pin 130-P in position to fit into the slots, FIG. 11, in each home position of the seal carrying member.

As shown in FIG. 11, two sleeve bearings which support the operating shaft may be outermost and the two shaft seals for preventing escape of air along the axis of the shaft may be inward of the sleeve bearings rather than outward as shown in FIG. 7.

The operating shaft 194 and seal carrier member 196, FIG. 11, are similar to those of FIG. 7. In all instances it is preferred that the link connection between the operating shaft and seal carrier member be slightly loose by a few thousandths of an inch (e.g. elongated opening for one of the pins) so that the seal is forced into sealing engagement by air pressure inside the valve housing.

Also, as shown in FIG. 11, it is preferred the shaft being drilled have a passage 198, opening to the atmosphere, and communicable (cross drill at 198A) with the interior of the valve housing when the operating shaft is displaced longitudinally so that there may be an audible perception of escaping air in the event a proper valve position is not attained after the shaft is turned and released to the return action of the spring. This loss of air may also be detected in the locomotive cab and the brakeman can be alerted to look for the car with the leak. The degree of air loss is purposely designed to be appreciably greater than that required for the brake pipe leak test required by statute at the point of departure of the train.

I claim:

1. In a brake system for a railroad vehicle equipped with a brake cylinder which receives fluid under pressure from an auxiliary reservoir when a fluid operated brake control valve, interposed between said cylinder and reservoir, is opened by a change in fluid pressure in a brake pipe, said brake control valve being connected to the brake pipe by a branch pipe which intersects a sectioned portion of the brake pipe:

a valve housing having three communicating openings of which one is assigned to the proximal end of the branch pipe and of which the remaining two are respectively assigned to the sectioned ends of the brake pipe;

a selectively positionable valve member inside the valve housing;

said valve member bearing effective in a first position to place all three openings in communication with each other thereby to communicate the branch pipe with both section ends of the brake pipe in said first position of the valve member, said valve member being effective in a second position to communicate the branch pipe opening with only a first one of the other two openings thereby to communicate the branch pipe solely with only one of the brake pipe section ends in said second position of the valve member, said valve member being effective in a third position to communicate the branch pipe opening with only the second one of the other two openings thereby to communicate the branch type solely with the other brake pipe section ends in said third position of the valve member, and said valve member in a fourth position being effective to communicate both brake pipe openings with one another while closing the branch pipe opening in said fourth position of the valve member;

and operating means connected to said valve member and extending outward at the housing for turning said valve member.

2. Structure according to claim 1 wherein the operating means is a rotary shaft extending through the valve housing and projecting from opposite sides thereof, said valve member being a plug connected to the shaft for rotary movement therewith and capable of sealing one of the openings in each of the second, third, and fourth positions.

3. Structure according to claim 2 including cooperating lock means on the housing and the shaft or valve member for locking the position of the shaft.

4. Structure according to claim 3 in which the lock means is a pin-in-slot lock requiring axial displacement of the shaft to disengage the lock before the shaft can be rotated.

5. Structure according to claim 4 in which the pin-in-slot lock is normally held engaged by spring means resisting axial displacement of the shaft.

6. Structure according to claim 2 in which the valve member is connected to the shaft at right angles to the shaft by a link connected to the shaft and valve member whereby axial displacement of the shaft displaces the valve member along the projected axis of the valve member, and wherein the pin connection is loose so that air pressure inside the valve housing forces the valve member into sealing position.

7. Structure according to claim 1 wherein the valve housing chamber incorporates a dirt trap chamber beneath the openings, and means for retaining dirt in said chamber.

8. Structure according to claim 2 or 6 in which the shaft has a passage therethrough communicable with the interior of the valve housing to release air with an audible sound when the valve member is incorrectly positioned.

9. In a brake system for a railroad vehicle equipped with a brake cylinder which receives fluid under pressure from an auxiliary reservoir when a fluid operated brake control valve, interposed between said cylinder and reservoir, is opened by a change in fluid pressure in a brake pipe, said brake control valve being connected to the brake pipe by a branch pipe which intersects a sectioned portion of the brake pipe:

a valve bearing having three communicating openings of which the first one is assigned to the proximal end of the branch pipe and of which the second and third are respectively assigned to the sectioned ends of the brake pipe;

a selectively positionable seal carrier member supporting a seal inside the valve housing;

said seal carrier member being effective in a first position to place all three openings in communication with each other thereby to communicate the branch pipe with both section ends of the brake pipe in said first position of the valve plug, said seal carrier member being effective in a second position to seal only the second opening thereby to communicate the branch pipe solely with only one of the brake pipe section ends in said second position of the seal carrier member, said seal carrier member being effective in a third position to seal only the third opening thereby to communicate the branch pipe solely with the other one of the brake pipe section ends in said third position of the seal carrier member and said seal carrier member in a fourth position being effective to communicate both brake pipe openings with one another while sealing the branch pipe opening in said fourth position;

an operating shaft supported on the valve housing for both axial displacement and rotary movement once displaced;

said seal carrier member being connected by a toggle link to the shaft so as to be displaced radially from one of its positions upon axial displacement of the shaft and orbited to a new position when the shaft is rotated;

spring means resisting axial shaft displacement;

and lock means to hold the shaft against rotary displacement.

10. Structure according to claim 9 wherein the last-named means is a pin-in-slot lock disengaged when the shaft is displaced.

11. Structure according to claim 10 including a pair of opposed coil springs acting in opposite directions axially on the shaft.

12. Structure according to claim 9 wherein the seal carrier member is of plug form, opposed walls inside the valve housing closely confining and guiding the plug in its orbital movement.

13. Structure according to claim 12 wherein the seal is separably clamped by a seal ring to the plug.

14. Structure according to claim 11 wherein the shaft at each end is equipped with an operating handle and wherein each coil spring applies an outward thrust against the related handle.

15. Structure according to claim 14 wherein each end of the shaft outward of the valve housing is coupled by a universal joint to another shaft, each handle being connected, respectively, to the other shaft.

16. Structure according to claim 9 wherein the seal carrier is loosely supported by the link so the seal is forced to sealing relation by air pressure inside the valve housing.

17. Structure according to claim 9 or 16 wherein the shaft has an axial passage therein communicable with the interior of the valve housing to produce an audible sound due to escaping air if the seal carrier member is incorrectly positioned.

* * * * *

UNITED STATES PATENT AND TRADEMARK OFFICE
CERTIFICATE OF CORRECTION

PATENT NO. : 4,153,305
DATED : May 8, 1979
INVENTOR(S) : Leroy P. Kennedy and James L. Kalkstein It is certified that error appears in the above-identified patent and that said Letters Patent are hereby corrected as shown below:

Column 2 line 51 change "vale" to --valve--.

Column 4 line 46 delete the parenthesis sign.

Column 6 line 23 change "change" to --chance--.

Column 8 line 42 change "bearing" to --being--; line 55 change "type" to --pipe--.

Column 9 line 39 change "bearing" to --housing--.

Signed and Sealed this

Twenty-eighth Day of August 1979

[SEAL]

Attest:

Attesting Officer

LUTRELLE F. PARKER
Acting Commissioner of Patents and Trademarks